(12) United States Patent
Shen

(10) Patent No.: US 7,685,075 B2
(45) Date of Patent: Mar. 23, 2010

(54) COSTING SYSTEM AND METHOD

(75) Inventor: Fong Shen, Kaohsiung (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 1138 days.

(21) Appl. No.: 11/032,567

(22) Filed: Jan. 10, 2005

(65) Prior Publication Data

US 2006/0155655 A1 Jul. 13, 2006

(51) Int. Cl.
*G06Q 99/00* (2006.01)

(52) U.S. Cl. .................. 705/400; 705/1; 705/7; 705/10; 705/37; 700/97; 700/100

(58) Field of Classification Search .......... 705/1, 705/10, 400; 700/97, 100
See application file for complete search history.

(56) References Cited

U.S. PATENT DOCUMENTS

| | | | |
|---|---|---|---|
| 5,016,170 A * | 5/1991 | Pollalis et al. ............... 705/7 |
| 6,311,094 B1 * | 10/2001 | Iriuchijima et al. ......... 700/100 |
| 6,393,410 B1 * | 5/2002 | Thompson ................. 705/37 |
| 6,895,382 B1 * | 5/2005 | Srinivasan et al. ............ 705/7 |
| 7,027,884 B2 * | 4/2006 | Watanabe et al. ............ 700/97 |
| 7,072,808 B2 * | 7/2006 | Tuszynski .................. 703/2 |
| 7,181,303 B2 * | 2/2007 | Scholl et al. ................ 700/97 |
| 7,330,821 B2 * | 2/2008 | Wares ....................... 705/7 |

| | | | |
|---|---|---|---|
| 2004/0249770 A1 * | 12/2004 | Yeh et al. ..................... 705/400 |
| 2005/0273401 A1 * | 12/2005 | Yeh et al. ..................... 705/29 |
| 2006/0155655 A1 * | 7/2006 | Shen .......................... 705/400 |

OTHER PUBLICATIONS

Swamy et al., "Manufacturing Cost Simulations for Low Cost RFID systems", Feb. 1, 2003, White paper, Auto-ID center Massachusetts Institute of Technology, 23 pgs.*
Bertolini et al., "Quality and Reliability Corner: An Analytical Method for Maintenance Outsourcing Service Selection", 2004, The International Journal of Quality & Reliability Management; 21, 6/7, p. 772-788, (17 pgs.).*
Langer, Eric S., "Big Shifts in Outsourcing of Biopharmaceutical Manufacturing-Half of Manufacturers to Outsource Production by 2008", Jan. 2004, Genetic Engineering News, 5 pgs.*

* cited by examiner

*Primary Examiner*—John W Hayes
*Assistant Examiner*—Freda A Nelson
(74) *Attorney, Agent, or Firm*—Thomas, Kayden, Horstemeyer & Risley

(57) ABSTRACT

A costing system. The costing system includes a costing model and a costing engine. The costing model records parent-child relationships between a plurality of stages of a production line, and at least one valuation type for each stage. The costing engine retrieves a group of valuation type combinations corresponding to the parent stages of the target stage from the costing model, and combines the target valuation type corresponding to the target stage with valuation type combinations corresponding to the parent stages, thereby generating a cost identification, and costing results accordingly.

16 Claims, 5 Drawing Sheets

COSTING SYSTEM AND METHOD

BACKGROUND

The present invention relates to a costing system and method, and particularly to a costing system and method utilizing a model providing multiple costs for a single production part.

In current use, companies endeavor to reduce production costs and strengthen competitive ability. In addition to cost management of materials and manpower, cost valuation of the production is also a significant base of corporate quotation and pricing, such that a precise costing system is critical. Without an accurate costing model for the costing system, costing and pricing results cannot reflect real margins and benefits.

FIG. 1 shows an example of a conventional costing model, including three stages X, Y and Z, having respective operating costs. Parent-child relationships between these stages must be defined in the costing system in advance. In the example, stage X is the parent stage for stage Y, stage Y is the parent stage for stage Z, and each product is processed from stage X to stage Z. The cost of part X (semi-finished goods) (CX) is the operating cost for stage X, the cost of part Y (CY) is the sum of the operating costs for stage Y and its parent cost (CX), and the cost of part Z (CZ) is the sum of the operating costs for stage Z and its parent cost (CY).

However, for some specific industries, such as semiconductor industry, there are more complicated business requirements and models therein. One business model of the semiconductor industry is "build to order", in which the IC (Integrated Circuit) foundry must fabricate products of different designs and processes, and according to specific client requirements. For example, semiconductor products may be processed through three process stages of wafer fabrication, testing, and packing. In one case, clients may request the IC foundry to manufacture their product designs without any further conditions, such that the IC foundry fabricates wafers according to client product design, tests the wafers, and divides and packs the wafers to IC products internally or by subcontracting. In another case, the clients may only ask the IC foundry to perform the testing or other process stages. The workpiece can, accordingly, be received at any stage, be partially or fully finished goods, and fabricated internally or outsourced. Production costs differ according to various production conditions, and thus, conventional costing models with one cost for a single production part cannot provide precise costing analysis to fulfill business requirements for companies with complicated business models.

SUMMARY

The present invention is proposed to solve the aforementioned issues. It should be noted that, although the invention is disclosed herein from the perspective of an IC foundry, its concept and spirit are not limited to IC foundries but may be applicable to other factories, service suppliers and products.

Accordingly, it is an object of the present invention to furnish a model providing multiple costs for a single production part.

It is another object of the present invention to provide a costing system and method utilizing the model providing multiple costs for a single production part for costing analysis according to various business requirements.

To achieve the above objects, the present invention provides a costing system and method. The costing system includes a costing model and a costing engine. The costing model records parent-child relationships between a plurality of stages of a production line, and at least one valuation type for each stage. The costing engine receives settings of a target stage and a target valuation type corresponding thereto through an interface.

The costing engine retrieves a first group of valuation type combinations corresponding to the parent stages of the target stage from the costing model, combines the target valuation type corresponding to the target stage with valuation type combinations corresponding to the parent stages to generate a cost identification, and generates costing results accordingly.

The costing engine further applies a business requirement to valuation type combinations in the cost identification, and generates a parent cost of the costing results according to the business requirement and valuation type combinations, including aggressive, conservative, or average business costing requirements.

The costing engine further retrieves a second group of valuation type combinations corresponding to the parent stages of the target stage from the costing model, combines the target valuation type corresponding to the target stage with the first and second groups of valuation type combinations to generate the cost identification, and generates the costing results.

In the costing method according to the present invention, a costing model is first provided, in which the costing model records parent-child relationships between a plurality of stages of a production line, and at least one valuation type for each stage. Then, a first group of valuation type combinations corresponding to the parent stages of a target stage is retrieved for stages from the costing model, and a target valuation type corresponding to the target stage and valuation type combinations corresponding to the parent stages are combined to generate a cost identification. Thereafter, costing results are generated based on the cost identification.

Similarly, a business requirement is further applied to valuation type combinations in the cost identification, and a parent cost of the costing results is generated according to the business requirement and valuation type combinations. Further, a second group of valuation type combinations corresponding to the parent stages of the target stage is retrieved from the costing model, the target valuation type corresponding to the target stage and the first and second groups of valuation type combinations are combined to generate the cost identification, and the costing results are generated.

The above-mentioned method and costing model may take the form of program code embodied in a tangible media. When the program code is loaded into and executed by a machine, the machine becomes an apparatus for practicing the invention.

One feature of an embodiment of the present invention is support of multiple costs for a single production part (stage).

Another feature of an embodiment of the present invention is strengthened costing capability and flexibility for various business requirements.

BRIEF DESCRIPTION OF THE DRAWINGS

The aforementioned objects, features and advantages of the invention will become apparent by referring to the following detailed description of the preferred embodiment with reference to the accompanying drawings, wherein.

DESCRIPTION

The present invention provides a system and method utilizing a model to overcome conventional costing problems.

As will be appreciated by persons skilled in the art from the discussion herein, the present invention has wide applicability to many manufacturers, factories, and industries. For discussion purposes, while disclosed embodiments reference semiconductor foundry manufacturing (i.e., wafer fabrication in an IC foundry), the present invention is not limited thereto.

Figure 1:
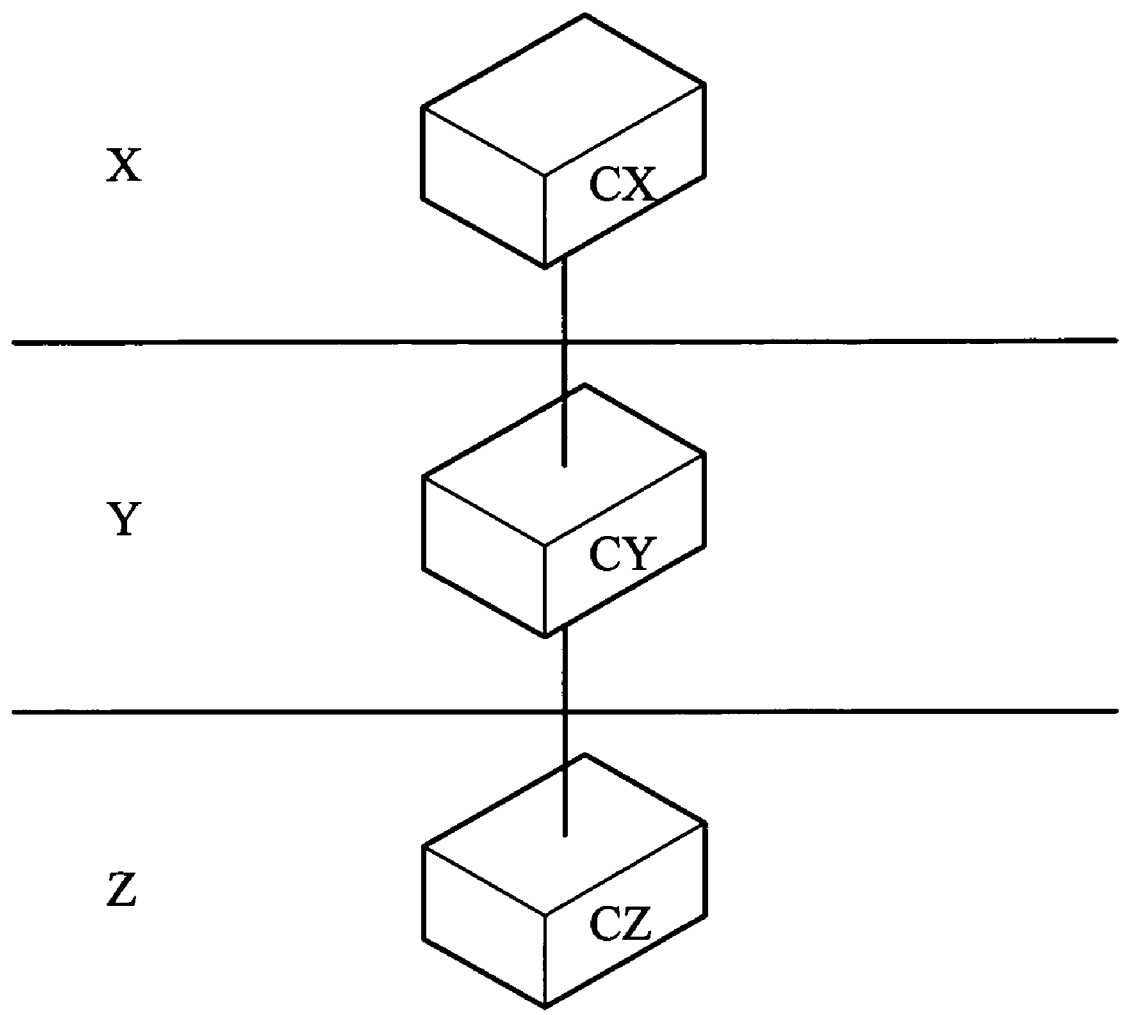
FIG. 1 is an example of a conventional costing model.
Figure 2:
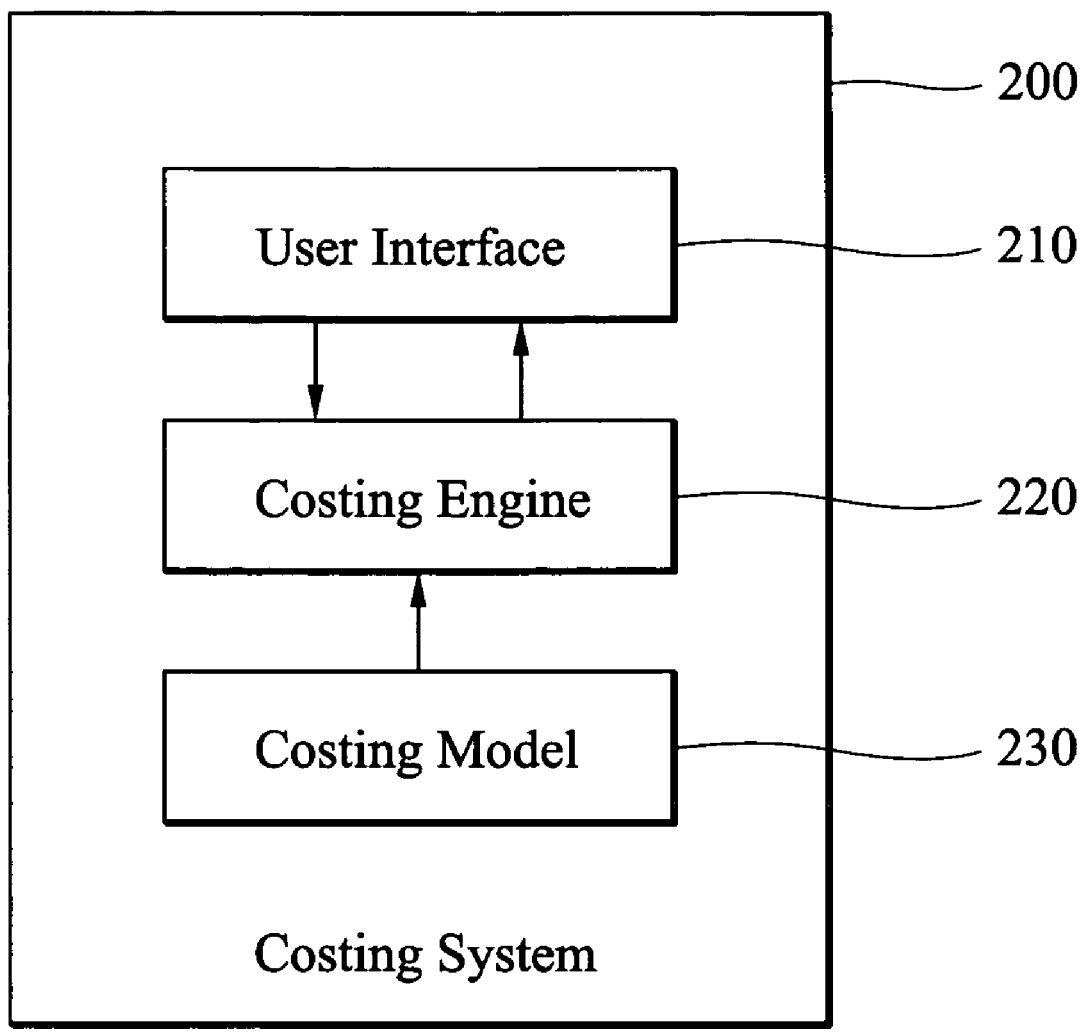
FIG. 2 is a schematic diagram of the architecture of the costing system according to the present invention.

FIG. 2 illustrates the architecture of the costing system 200 according to an embodiment of the present invention. The costing system 200 includes a user interface 210, a costing engine 220 and a costing model 230.

The user interface 210 receives information, such as product information, initial and/or target stages, and target valuation type corresponding to the target stage input by users, and forwards it to the costing engine 220. Additionally, the user interface 210 displays costing results generated by the costing engine 220.

The costing model 230 records parent-child relationships between stages of a production line, and valuation types for each stage. It is understood that the parent stages for each stage (child stage) are well defined in the costing model 230, and the number of valuation types for each stage can be flexibly defined according to production type, such as internal or outsourced production and the like. The data structure of the costing model may contain at least a first field containing data representing a plurality of stages having parent-child relationships of a production line and a second field containing data representing at least one valuation type for each stage, in which at least one group of valuation type combinations corresponding to each parent stage of a target stage represents a parent identification generating a parent cost of the target stage, in which the fields may be data columns of the costing model.

Figure 3:
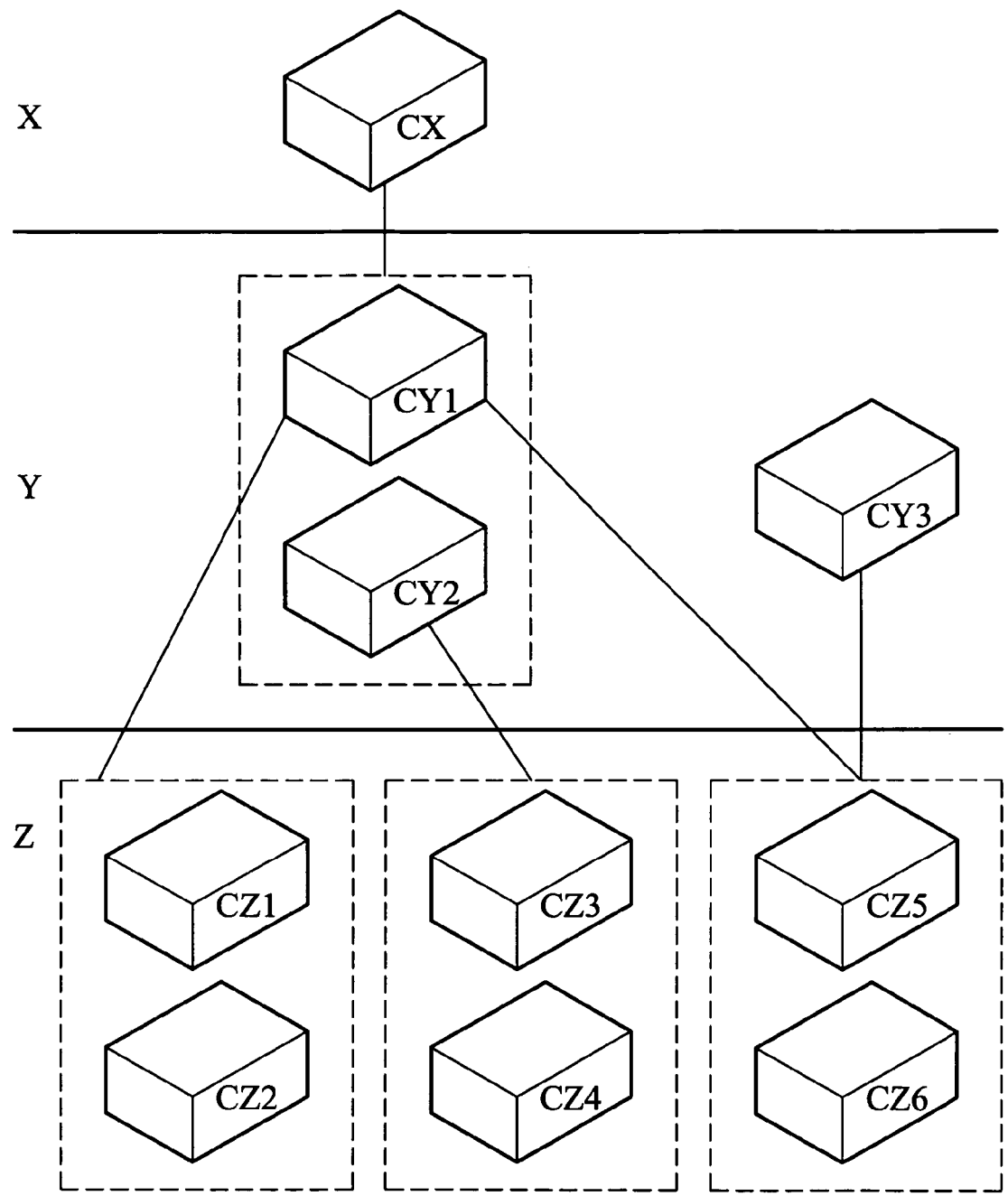
FIG. 3 is an example of the model according to the present invention.

FIG. 3 shows an example of the costing model 230 according to the embodiment of the present invention. As shown in FIG. 3, the costing model 230 includes three stages X, Y and Z, having respective operating costs and parent-child relationships. In the example, stage X is the parent stage for stage Y, stage Y is the parent stage for stage Z, and each product is processed from stage X to stage Z. The cost of part X (CX) is the operating cost for stage X. The cost of part Y may be different based on its production behavior of this stage, for example, the cost of part Y produced internally (CY1) is the sum of the internal production operating costs for stage Y and its parent cost (CX), and the cost of part Y outsourced (CY2) is the sum of the outsourced operating costs for stage Y and its parent cost (CX).

Similarly, the workpiece for stage Z may also be produced internally or outsourced. Therefore, if the workpiece is produced internally in stage Y, the cost of part Z produced internally (CZ1) is the sum of the internal production operating costs for stage Z and its parent cost (CY1), and the cost of part Z outsourced (CZ2) is the sum of the outsourced operating costs for stage Z and its parent cost (CY1). In addition, if the workpiece is outsourced production in stage Y, the cost of part Z produced internally (CZ3) is the sum of the internal production operating costs for stage Z and its parent cost (CY2), and the cost of part Z outsourced (CZ4) is the sum of the outsourced operating costs for stage Z and its parent cost (CY2).

In wafer fabrication, a new business demand is referred to as "stackdie", that is two respective workpieces may be combined and produced in the child stage. In FIG. 3, the cost of part Z including two workpieces produced internally (CZ5) is the sum of the internal production operating costs for stage Z and its parent costs (CY1 and CY3), and the cost of part Z outsourced (CZ6) is the sum of the outsourced operating costs for stage Z and its parent costs (CY1 and CY3).

According to the costing model 230 of the embodiment of the present invention, the cost of a workpiece at a target stage can be formulated as:

$$CP_{Ti} = OC_{Ti} + \text{Sum}[PCj_K(P_N)]$$

Where $CP_{Ti}$ represents the partial cost of the target stage, i the valuation type of the target stage, $OC_{Ti}$ the operating costs of the valuation type at the target stage, $PCj_K(P_N)$ the parent cost of the target stage, in which j is the number of parent workpieces, K the business requirement for valuation (discussed later), and $P_N$ the group of valuation type combinations corresponding to the parent stages of the target stage.

The costing engine 220 may receive information forwarded from the user interface 210, retrieve a group of valuation type combinations corresponding to the parent stages between the target stage and the initial stage including the initial stage from the costing model 230, combine the target valuation type corresponding to the target stage with valuation type combinations corresponding to the parent stages to generate a cost identification, generate costing results accordingly and a mapping table recording actual cost for each stage in different valuation types, and display the costing results via the user interface 210. It is understood that if the product of the target stage has two parent workpieces, the costing engine 220 further retrieves another group of valuation type combinations corresponding to the parent stages of the target stage from the costing model, combines the target valuation type corresponding to the target stage with the two groups of valuation type combinations to generate the cost identification, and generates the costing results.

Additionally, the costing engine 220 further applies a business requirement of valuation to valuation type combinations in the cost identification, and generates a parent cost of the costing results according to the, business requirement and valuation type combinations, in which the business requirement may include aggressive, conservative, and average costing requirements. For example, if the business requirement is for aggressive costing, the parent cost $PCj_K(P_N)$ can be represented as $\text{Max}(P_N)$, if conservative costing, the parent cost $PCj_K(P_N)$ can be represented as $\text{Min}(P_N)$, and average costing, the parent cost $PCj_K(P_N)$ can be represented as $\text{Avg}(P_N)$. It is understood that the business requirement of valuation can be flexibly extended and defined according to different business rules and requirements.

Figure 4:
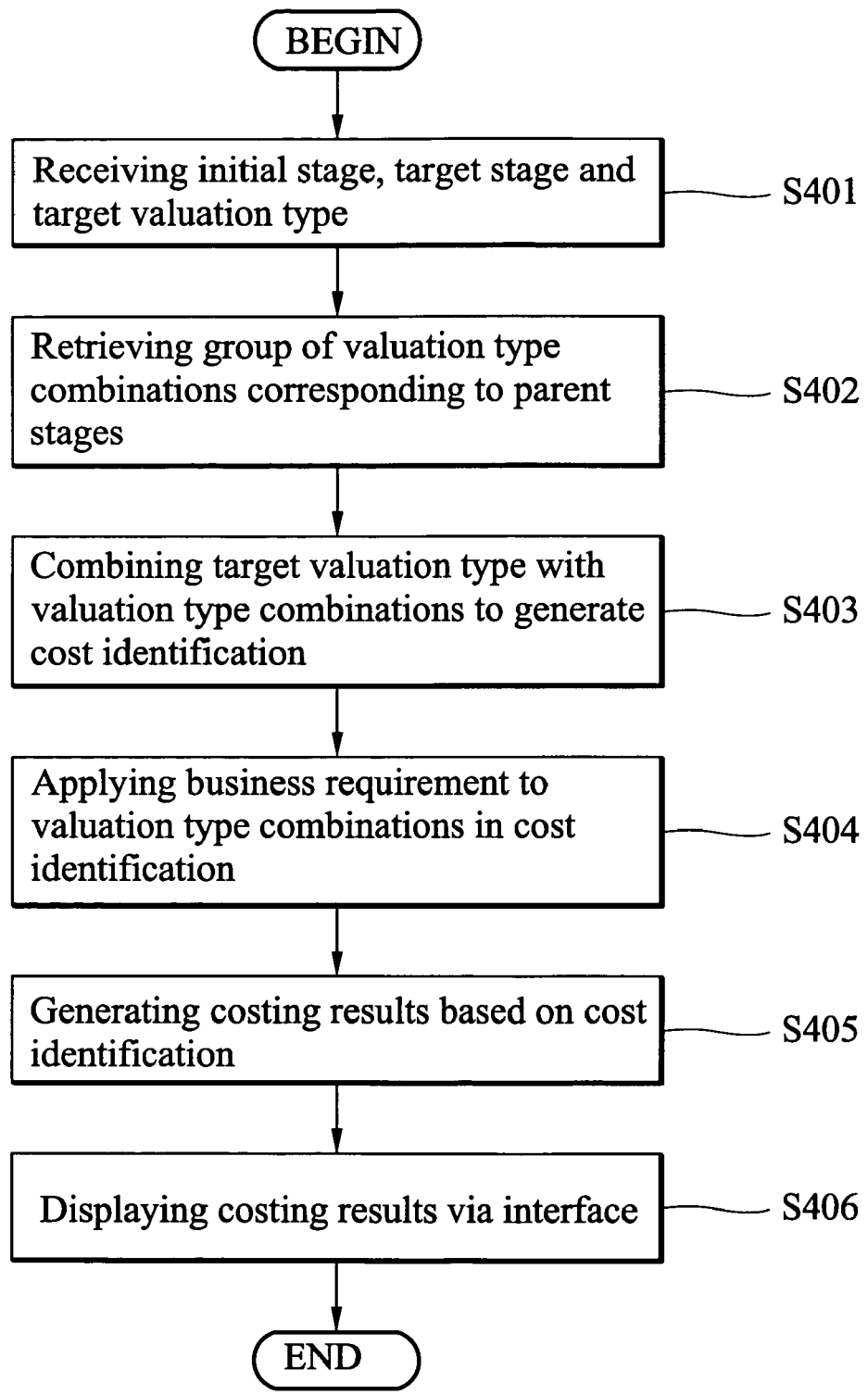
FIG. 4 is a flowchart showing the process of the costing method according to the present invention.

FIG. 4 shows the process of the costing method according to another embodiment of the present invention, in which a costing model recording parent-child relationships between a plurality of stages of a production line, and at least one valuation type for each stage, is provided.

First, in step S401, an initial stage, a target stage and a target valuation type are received through an interface. Then, in step S402, at least one group of valuation type combinations corresponding to the parent stages between the target stage and the initial stage including the initial stage is retrieved from the costing model. Afterward, in step S403, the target valuation type corresponding to the target stage and valuation type combinations corresponding to the parent stages are combined, thus generating a cost identification. Then, in step S404, a business requirement is applied to valuation type combinations in the cost identification. Thereafter, in step S405, costing results are generated based on the cost identification, and in step S406, the costing results are displayed via the interface.

Figure 5:
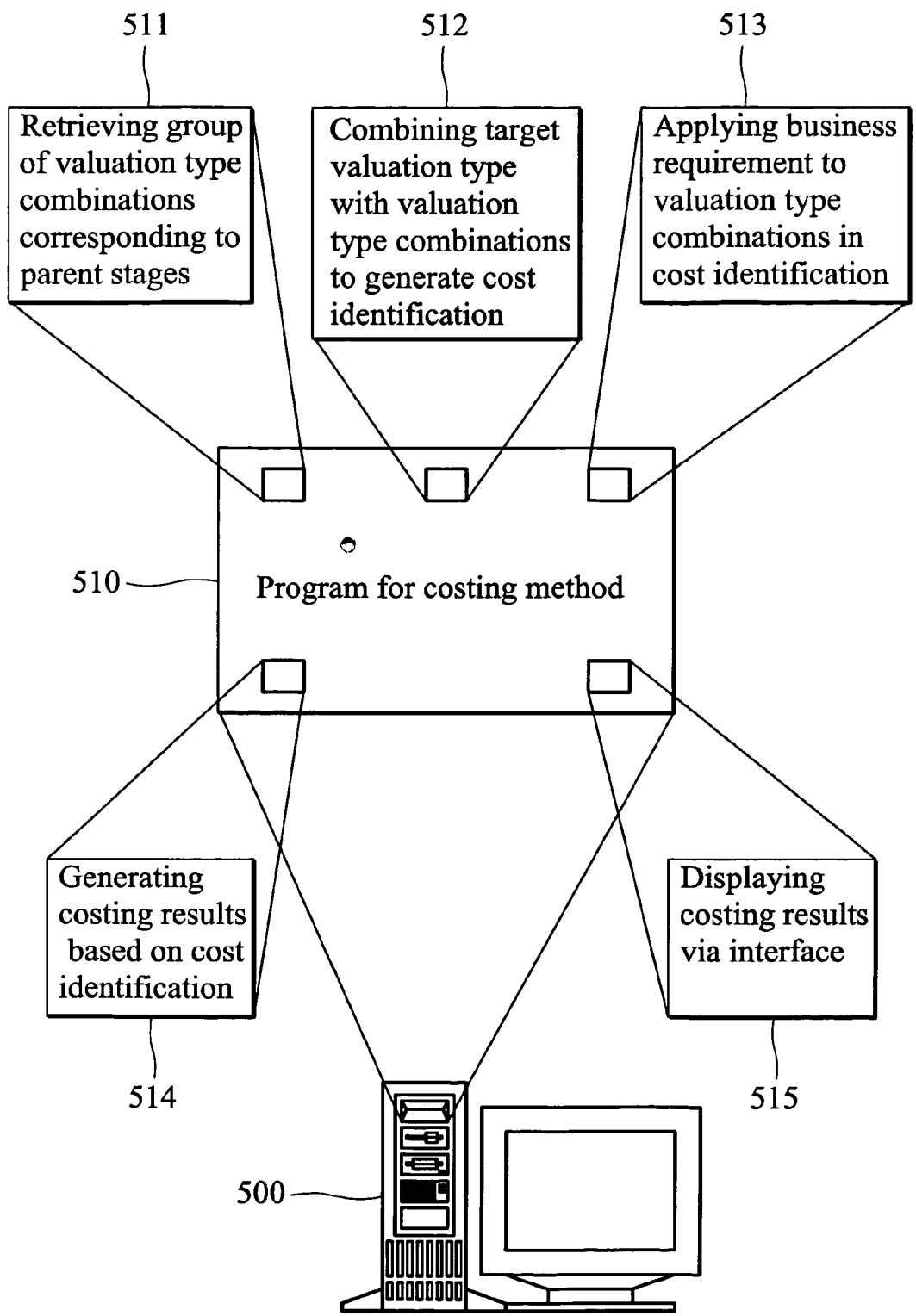
FIG. 5 is a schematic diagram of a storage medium for a computer program providing the costing method according to the present invention.

FIG. 5 is a schematic diagram of a storage medium for a computer program providing the costing method according to the present invention. The computer program product includes a storage medium 510 having computer readable program code embodied in the medium for use in a computer system 500, the computer readable program code comprising at least computer readable program code 511 retrieving at least one group of valuation type combinations corresponding to the parent stages between the target stage and the initial stage including the initial stage, computer readable program code 512 combining the target valuation type corresponding to the target stage with valuation type combinations corresponding to the parent stages, thus generating a cost identification, computer readable program code 513 applying a business requirement to valuation type combinations in the cost identification, computer readable program code 514 generating costing results accordingly, and computer readable program code 515 displaying the costing results via the interface.

The present invention thus provides a costing system and method, and a novel costing model providing multiple costs for a single production part to assess the partial cost of products at any stage, thereby supporting "stackdie" business, increasing the accuracy of costing analysis and strengthening costing capability and flexibility for various business requirements.

The method and system of the present invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The method and systems of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to application specific logic circuits.

Although the present invention has been described in its preferred embodiments, it is not intended to limit the invention to the precise embodiments disclosed herein. Those skilled in this technology can still make various alterations and modifications without departing from the scope and spirit of the invention. Therefore, the scope of the present invention shall be defined and protected by the following claims and their equivalents.

What is claimed is:

1. A costing system comprising:
    a storage medium storing a costing model recording parent-child relationships between a plurality of stages of a production line, wherein each stage comprises at least two valuation types, and the valuation types comprise internal production and outsourced production, and the costing model records an internal cost and an outsourcing cost respectively corresponding to the internal production and the outsourced production for each stage; and
    a processor executing a costing engine to retrieve the valuation types corresponding to parent stages of a target stage of a production line from the costing model, generate a first group of valuation type combinations according to the retrieved valuation types, combine a target valuation type corresponding to the target stage with the first group of valuation type combinations corresponding to the parent stages to generate a cost identification, and generate a plurality of costing results for the target stage in each valuation type combination of the first group accordingly by retrieving outsourcing costs and internal costs corresponding to the respective parent stages from the costing model, retrieving an outsourcing cost or an internal cost corresponding to the target valuation type of the target stage from the costing model, and respectively combining the outsourcing costs and the internal costs corresponding to the respective parent stages with the outsourcing cost or the internal cost corresponding to the target valuation type of the target stage based on the respective valuation type combinations in the first group, thus to obtain the costing results for the target stage in each valuation type combination.

2. The system of claim 1 wherein valuation type combinations further correspond to stages between the target stage and an initial stage, wherein the stages include the initial stage.

3. The system of claim 1 wherein the costing engine further applies a business requirement to the first group of valuation type combinations in the cost identification, and generates a parent cost of the costing results according to the business requirement and the first group of valuation type combinations.

4. The system of claim 3 wherein the business requirement comprises aggressive, conservative, or average costing requirements.

5. The system of claim 1 wherein the costing engine further retrieves a second group of valuation type combinations corresponding to the parent stages of the target stage from the costing model, combines the target valuation type corresponding to the target stage with the first and second groups of valuation type combinations to generate the cost identification, and generates the costing results accordingly.

6. The system of claim 5 wherein the costing engine further applies a business requirement to each group of valuation type combinations in the cost identification, and generates a parent cost corresponding to each group of the costing results according to the business requirement and valuation type combinations of each group.

7. The system of claim 6 wherein the business requirement comprises aggressive, conservative, or average costing requirements.

8. The system of claim 6 wherein the cost identification is formulated as:

$$CP_{Ti} = OC_{Ti} + \mathrm{Sum}[PCj_K(P_N)],$$

in which $CP_{Ti}$ represents a partial cost of the target stage; i represents the target valuation type; $OC_{Ti}$ represents an operating cost of the target valuation type in the target stage; $PCj_K(P_N)$ represents a parent cost of the target stage, in which j is the number of parent workpieces, K represents the business requirement; and $P_N$ represents the group of valuation type combinations.

9. A machine-readable tangible storage medium storing a computer program which, when executed, directs a computer to perform a costing method, comprising the steps of:

providing a costing model recording parent-child relationships between a plurality of stages of a production line, wherein each stage comprises at least two valuation types, and the valuation types comprise internal production and outsourced production, and the costing model records an internal cost and an outsourcing cost respectively corresponding to the internal production and the outsourced production for each stage; retrieving a first group of valuation type combinations corresponding to parent stages of a target stage from the costing model;

combining a target valuation type corresponding to the target stage with the first group of valuation type combinations corresponding to the parent stages to generate a cost identification; and generating a plurality of costing results for the target stage in each valuation type combination of the first group accordingly by retrieving outsourcing costs and internal costs corresponding to the respective parent stages, retrieving an outsourcing cost or an internal cost corresponding to the target valuation type of the target stage, and respectively combining the outsourcing costs and the internal costs corresponding to the respective parent stages with the outsourcing cost or the internal cost corresponding to the target valuation type of the target stage based on the respective valuation type combinations in the first group, thus to obtain the costing results for the target stage in each valuation type combination.

10. The tangible storage medium of claim 9 wherein valuation type combinations further correspond to stages between the target stage and an initial stage, wherein the stages include the initial stage.

11. The tangible storage medium of claim 9 wherein the method further comprises applying a business requirement to the first group of valuation type combinations in the cost identification, and generating a parent cost of the costing results according to the business requirement and valuation type combinations.

12. The tangible storage medium of claim 11 wherein the business requirement comprises aggressive, conservative, or average costing requirements.

13. The tangible storage medium of claim 9 wherein the method further comprises retrieving a second group of valuation type combinations corresponding to the parent stages of the target stage from the costing model, combining the target valuation type corresponding to the target stage with the first and second groups of valuation type combinations to generate the cost identification, and generating the costing results accordingly.

14. The tangible storage medium of claim 13 wherein the method further comprises applying a business requirement to each group of valuation type combinations in the cost identification, and generating a parent cost corresponding to each group of the costing results according to the business requirement and valuation type combinations of each group.

15. The tangible storage medium of claim 14 wherein the business requirement comprises aggressive, conservative, or average costing requirements.

16. The tangible storage medium of claim 14 wherein the cost identification is formulated as:

$$CP_{Ti}=OC_{Ti}+\text{Sum}[PCj_K(P_N)],$$

in which $CP_{Ti}$ represents a partial cost of the target stage;

i represents the target valuation type;

$OC_{Ti}$ represents an operating cost of the target valuation type in the target stage;

$PCj_K(P_N)$ represents a parent cost of the target stage, in which j is the number of parent workpieces, K represents the business requirement; and $P_N$ represents the group of valuation type combinations.

* * * * *